United States Patent
Kim

(10) Patent No.: US 10,073,458 B2
(45) Date of Patent: Sep. 11, 2018

(54) PATH DETERMINING APPARATUS FOR AUTONOMOUS DRIVING VEHICLE AND PATH DETERMINING METHOD

(71) Applicant: Hyundai Motor Company, Seoul (KR)

(72) Inventor: Jun Soo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/462,612

(22) Filed: Mar. 17, 2017

(65) Prior Publication Data
US 2018/0136662 A1 May 17, 2018

(30) Foreign Application Priority Data
Nov. 11, 2016 (KR) .................. 10-2016-0150548

(51) Int. Cl.
| | | |
|---|---|---|
| G05D 1/02 | (2006.01) | |
| G01C 21/34 | (2006.01) | |
| G08G 1/16 | (2006.01) | |
| G05D 1/00 | (2006.01) | |

(52) U.S. Cl.
CPC ....... *G05D 1/0214* (2013.01); *G01C 21/3415* (2013.01); *G01C 21/3446* (2013.01); *G08G 1/165* (2013.01); *G08G 1/166* (2013.01); *G05D 1/0088* (2013.01)

(58) Field of Classification Search
CPC ............... G05D 1/0214; G05D 1/0088; G01C 21/3415; G01C 21/3445; G08G 1/165; G08G 1/166; B60W 2550/14; B60W 2550/141; B60W 40/06

USPC .......................................................... 701/26
See application file for complete search history.

(56) References Cited

U.S. PATENT DOCUMENTS

| | | |
|---|---|---|
| 8,126,642 B2 | 2/2012 | Trepagnier et al. |
| 8,457,827 B1 | 6/2013 | Ferguson et al. |
| 8,473,144 B1 | 6/2013 | Dolgov et al. |
| 8,706,394 B2 | 4/2014 | Trepagnier et al. |
| 9,097,549 B1 | 8/2015 | Rao et al. |
| 9,187,088 B1 | 11/2015 | Ferguson et al. |
| 2015/0353082 A1 | 12/2015 | Lee et al. |
| 2016/0061612 A1 | 3/2016 | You et al. |
| 2016/0129907 A1 | 5/2016 | Kim et al. |
| 2017/0123428 A1* | 5/2017 | Levinson ............. G05D 1/0214 |

FOREIGN PATENT DOCUMENTS

| | | |
|---|---|---|
| JP | 2012083892 A | 4/2012 |
| KR | 20110074629 A | 6/2011 |
| KR | 20150084143 A | 7/2015 |
| KR | 101610502 B1 | 4/2016 |
| KR | 20160056711 A | 5/2016 |

\* cited by examiner

*Primary Examiner* — Marthe Y Marc-Coleman
(74) *Attorney, Agent, or Firm* — Slater Matsil, LLP

(57) ABSTRACT

A path determining apparatus for an autonomous driving vehicle includes a path generator periodically generating a plurality of autonomous driving paths, an adaptive likelihood field (ALF) detector detecting an ALF on a road based on road information and obstacle information, a weight setter applying the ALF detected by the ALF detector to each of the autonomous driving paths generated by the path generator to set a weight with respect to each of the autonomous driving paths, and a path determiner determining a final autonomous driving path based on the weight set with respect to each of the autonomous driving paths by the weight setter.

20 Claims, 10 Drawing Sheets

PATH DETERMINING APPARATUS FOR AUTONOMOUS DRIVING VEHICLE AND PATH DETERMINING METHOD

CROSS-REFERENCE TO RELATED APPLICATIONS

This application is based on and claims the benefit of priority to Korean Patent Application No. 10-2016-0150548, filed on Nov. 11, 2016, in the Korean Intellectual Property Office, the disclosure of which is incorporated herein in its entirety by reference.

TECHNICAL FIELD

The present application relates to autonomous driving vehicles, and in particular to path determining apparatus for autonomous driving vehicle and path determining method.

BACKGROUND

An autonomous driving vehicle uses a global positioning system (GPS) to locate its current position and plans a driving path in accordance with an environmental recognition result based on information obtained from a laser sensor, a vision sensor, and the like.

The autonomous driving vehicle selects an optimal path among previously-defined candidate paths to plan the path. In this case, a sampling technique, which generates the candidate paths corresponding to a road shape and selects the optimal path among the candidate paths, is mainly used to plan the path in real time.

The sampling technique finds more stable and optimal path as the number of the candidate paths increases, but an amount of computation increases to find the optimal path. That is, an optimization of the path and an efficiency of the computation are in a trade-off relation with each other.

Since a conventional path determining method generates a large number of candidate paths and selects the optimal path among the generated candidate paths, the amount of the computation increases, and the efficiency of the computation is lowered.

In addition, another conventional path determining method does not effectively reduce the number of the candidate paths, and thus there is a problem of not being able to select the optimal path.

SUMMARY

The present disclosure has been made to solve the above-mentioned problems occurring in the prior art while advantages achieved by the prior art are maintained intact.

An aspect of the present disclosure provides a path determining apparatus for an autonomous driving vehicle, which is capable of selecting an optimal path among optimized candidate paths by periodically generating a plurality of autonomous driving paths, detecting an adaptive likelihood field (ALF) on a road based on road information and obstacle information, applying the ALF on each path to set a weight with respect to each path, and determining a final autonomous driving path based on the weight, and a path determining method.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a path determining apparatus for an autonomous driving vehicle includes a path generator periodically generating a plurality of autonomous driving paths, an adaptive likelihood field (ALF) detector detecting an ALF on a road based on road information and obstacle information, a weight setter applying the ALF detected by the ALF detector to each of the autonomous driving paths generated by the path generator to set a weight with respect to each of the autonomous driving paths, and a path determiner determining a final autonomous driving path based on the weight set with respect to each of the autonomous driving paths by the weight setter.

The path generator calculates target positions at a current time point based on target positions calculated at a previous time point and present driving information and updates the autonomous driving paths.

The driving information include a speed of the vehicle, an azimuth of the vehicle, and model information of the vehicle, and the obstacle information include static obstacle information and dynamic obstacle information.

The ALF detector includes a first ALF detector detecting a first ALF based on the road information such that the vehicle drives along a center of a lane, a second ALF detector detecting a second ALF based on the static obstacle information such that the vehicle avoids a collision with a static obstacle, a third ALF detector detecting a third ALF based on the dynamic obstacle information such that the vehicle avoids a collision with a dynamic obstacle, and an ALF integrator integrating the first ALF, the second ALF, and the third ALF and to generate a final ALF.

The road information include at least one of a lane of the road, a width of the road, or a shape of the road, the static obstacle information include at least one of a position, a size, or a shape of the static obstacle on the road, and the dynamic obstacle information include at least one of a position, a speed, a direction, a size, or a shape of the dynamic obstacle on the road.

The weight setter gives a high weight to an autonomous driving path in which the autonomous driving vehicle has a low probability of collision with an obstacle among the autonomous driving paths, and in this case, the path determiner determines the autonomous driving path given with the high weight as the final autonomous driving path.

According to another aspect of the present disclosure, a path determining method for an autonomous driving vehicle includes allowing a path generator to periodically generate a plurality of autonomous driving paths, allowing an adaptive likelihood field (ALF) detector to detect an ALF on a road based on road information and obstacle information, allowing a weight setter to apply the detected ALF to each of the generated autonomous driving paths and to set a weight with respect to each of the autonomous driving paths, and allowing a path determiner to determine a final autonomous driving path based on the weight set with respect to each of the autonomous driving paths.

The generating the autonomous driving paths includes calculating target positions at a current time point based on target positions calculated at a previous time point and present driving information to update the autonomous driving paths.

The driving information include a speed of the vehicle, an azimuth of the vehicle, and model information of the vehicle, and the obstacle information include static obstacle information and dynamic obstacle information.

The detecting the ALF includes detecting a first ALF based on the road information such that the vehicle drives along a center of a lane, detecting a second ALF based on the static obstacle information such that the vehicle avoids a collision with a static obstacle, detecting a third ALF based on the dynamic obstacle information such that the vehicle avoids a collision with a dynamic obstacle, and integrating the first ALF, the second ALF, and the third ALF and to generate a final ALF.

The road information include at least one of a lane of the road, a width of the road, or a shape of the road, the static obstacle information include at least one of a position, a size, or a shape of the static obstacle on the road, and the dynamic obstacle information include at least one of a position, a speed, a direction, a size, or a shape of the dynamic obstacle on the road.

The setting the weight includes giving a high weight to an autonomous driving path in which the autonomous driving vehicle has a low probability of collision with an obstacle among the autonomous driving paths, and in this case, the determining the autonomous driving path includes determining the autonomous driving path given with the high weight as the final autonomous driving path.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

The above and other objects, features and advantages of the present invention will be more clearly understood from the following detailed description taken in conjunction with the accompanying drawings, and thus the technical idea of the present invention will be embodied by those skilled in the art. Further, in the description of the present invention, when it is determined that the detailed description of the related art would obscure the gist of the present invention, the description thereof will be omitted. Hereinafter, preferred embodiments of the present invention will be described in detail.

The present disclosure relates to a path determining apparatus for an autonomous driving vehicle and a path determining method, and more particularly, to a technology capable of determining an optimal autonomous driving path among autonomous driving paths in consideration of an error of a sensor using a probability-based filtering algorithm and based on weights depending on an adaptive likelihood field (ALF) on a road.

Figure 1:
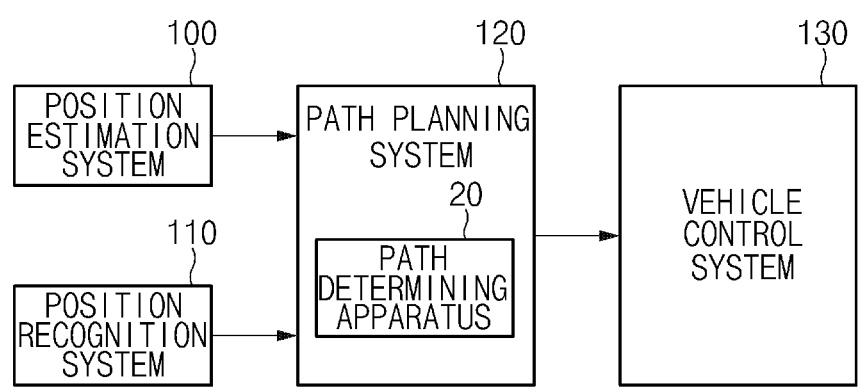
FIG. 1 is a block diagram showing an autonomous driving system to which a path determining apparatus is applied, according to an exemplary embodiment of the present invention.

FIG. 1 is a block diagram showing an autonomous driving system to which a path determining apparatus is applied, according to an exemplary embodiment of the present invention.

As shown in FIG. 1, the autonomous driving system, to which the embodiments of the present invention are applied, includes a position estimation system 100, a position recognition system no, a path planning system 120, and a vehicle control system 130.

The position estimation system 100 may provide various driving information, e.g., a speed, azimuth, and model information of vehicle, etc., to the path planning system 120.

The position recognition system no provides road information and obstacle information to the path planning system 120 as various recognition information. In this case, the road information include lanes on road, a width of road, a shape of road, and the like, static obstacle information include a position, size, and shape of a static obstacle on the road, and dynamic obstacle information include a position, speed, direction, size, and shape of a dynamic obstacle on the road.

The path planning system 120 is a system to which the path determining apparatus 20 for the autonomous driving vehicle according to the present invention is applied, and the path planning system 120 determines overall behavior of the vehicle using various information provided from the position estimation system 100 and the position recognition system no.

In particular, the path planning system 120 periodically generates autonomous driving paths using the various information provided from the position estimation system 100 and the position recognition system no, detects an adaptive likelihood field (ALF) on the road based on the road information and the obstacle information, applies the ALF to each path to set a weight with respect to each path, and determines a final autonomous driving path based on the weight.

The vehicle control system 130 controls overall behavior of the autonomous driving vehicle to allow the autonomous driving vehicle to drive the final autonomous driving path determined by the path planning system 120.

Hereinafter, the path determining apparatus 20 for the autonomous driving vehicle according to the present invention will be described in detail with reference to FIG. 2.

Figure 2:
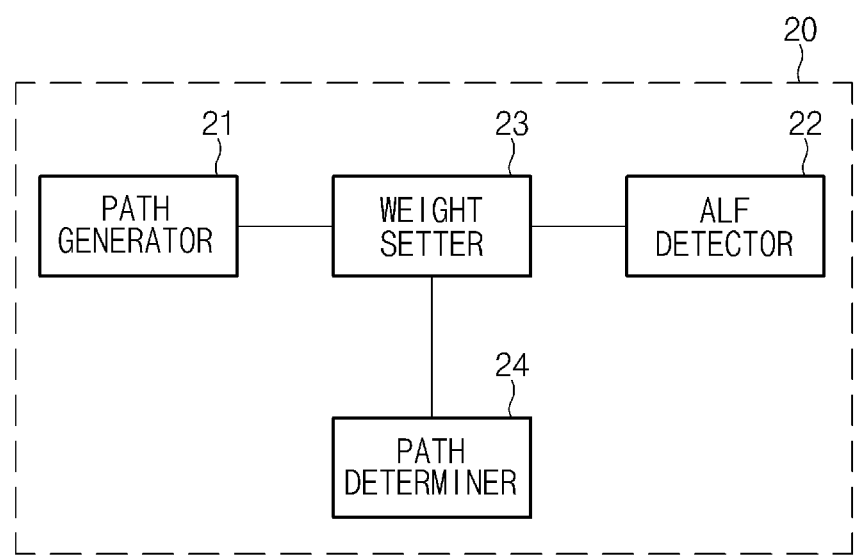
FIG. 2 is a block diagram showing a path determining apparatus for an autonomous driving vehicle, according to an exemplary embodiment of the present invention.

FIG. 2 is a block diagram showing the path determining apparatus 20 for the autonomous driving vehicle, according to an exemplary embodiment of the present invention.

As shown in FIG. 2, the path determining apparatus 20 for the autonomous driving vehicle according to an exemplary embodiment of the present invention includes a path generator 21, an ALF detector 22, a weight setter 23, and a path determiner 24. These components are functional configurations each organized based on its function, and a function of each component may be implemented to be performed by a processor.

The path generator 21 periodically generates the autonomous driving paths. That is, the path generator 21 calculates target positions at a current time point based on target positions calculated at a previous time point and driving information at the current time point to update the autonomous driving paths.

Figure 3:
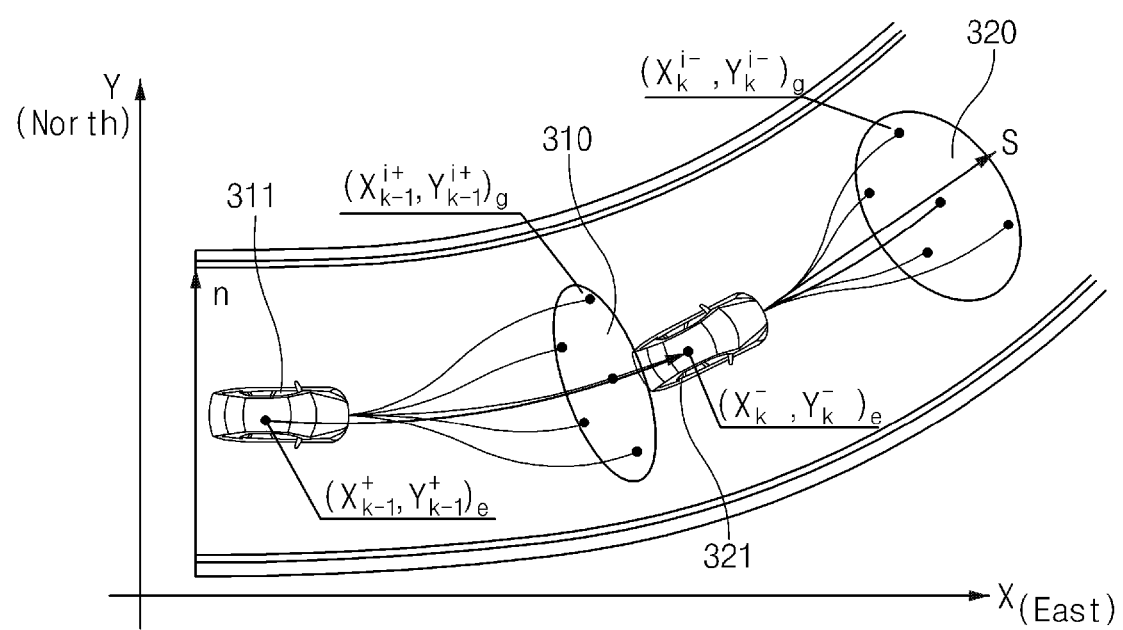
FIG. 3 is a view showing a process of calculating a target position by a path generator, according to an exemplary embodiment of the present invention.

FIG. 3 shows a process in which the path generator 21 calculates a first target position at an initial position and calculates a second target position at an update time point (at which the autonomous driving vehicle reaches the first target position). The calculation process of the target position is repeatedly performed until the autonomous driving vehicle reaches a final destination.

In this case, the path generator 21 calculates the target position based on the following Equation 1.

$$\begin{bmatrix} X_k^{i-} \\ Y_k^{i-} \end{bmatrix}_g = \begin{bmatrix} X_{k-1}^{i+} \\ Y_{k-1}^{i+} \end{bmatrix}_g + \Delta T \cdot (V_{k-1}^+ + \varepsilon_V^j) \begin{bmatrix} \cos(\psi_{k-1}^+ + \varepsilon_\psi^j) \\ \sin(\psi_{k-1}^+ + \varepsilon_\psi^j) \end{bmatrix} \quad \text{EQUATION 1}$$

In Equation 1, $[X^i \ Y^i]_g^T$ denotes an i-th target position, "V" denotes the speed of the vehicle, $\Delta T$ denotes an update cycle (path generation cycle), $\psi$ denotes the azimuth of the vehicle, $\varepsilon_V^i$ denotes a constant value required to compensate for a speed recognition error, $\varepsilon_\psi^i$ denotes a constant value required to compensate for an azimuth recognition error, and "k" denotes a time point.

In FIG. 3, target positions included in a first group 310 indicate first target positions calculated at an initial position 311, and target positions included in a second group 320 indicate second target positions calculated at the update cycle.

The ALF detector 22 detects the ALF on the road based on the road information and the obstacle information.

Here, the road information include the lanes on the road, the width of the road, the shape of the road, and the like, and the obstacle information include the static obstacle information and the dynamic obstacle information. The static obstacle information include the position, size, and shape of the static obstacle on the road, and the dynamic obstacle information include the position, speed, direction, size, and shape of the dynamic obstacle on the road.

Hereinafter, the process of detecting the ALF on the road using the ALF detector 22 will be described in detail with reference to FIG. 4, the process of detecting the ALF of the static obstacle using the ALF detector 22 will be described in detail with reference to FIG. 5, and the process of detecting the ALF of the dynamic obstacle using the ALF detector 22 will be described in detail with reference to FIG. 6.

Figure 4:
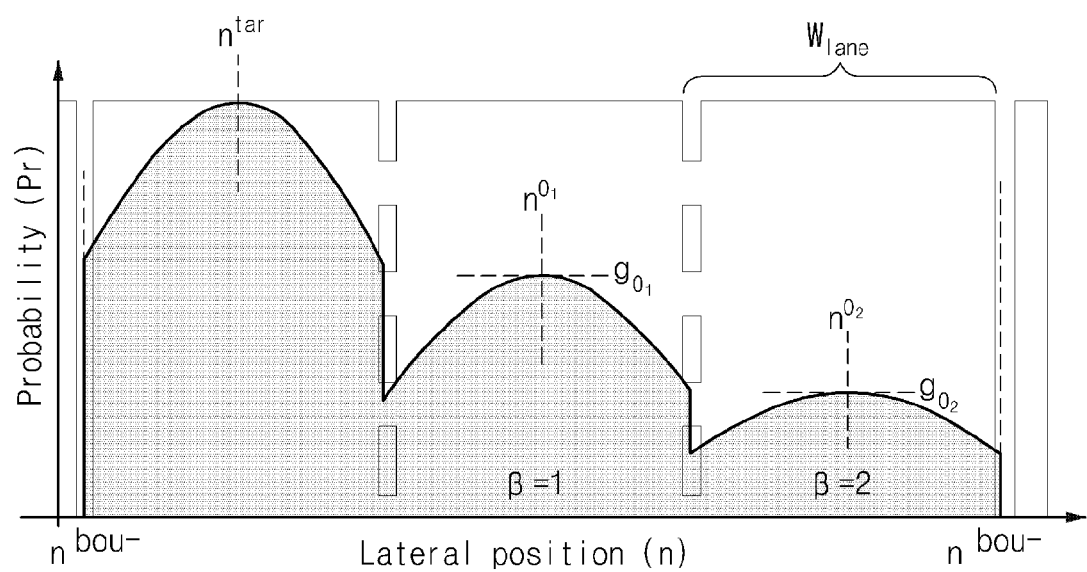
FIG. 4 is a view showing a process of detecting an ALF of a road shape by an ALF detector, according to an exemplary embodiment of the present invention.

Among a left lane, a central lane ($\beta$=1), and a right lane ($\beta$=2) shown in FIG. 4, the left lane indicates a target lane, $ALF(p_r(z_k|T_{j,k}^{i-},m))$ in the target lane is detected by the following Equation 2, $ALF(p_r(z_k|T_{j,k}^{i-},m))$ in the central lane and the left lane is detected by the following Equation 3, and an outside of the road is indicated by "o".

In FIG. 4, $n^{tar}$ denotes a lateral position of a center (a center of the width of the lane) of the target lane, $n^{o_1}$ denotes a lateral position of a center of the central lane (a first lane next to the target lane), $g_{o_1}$ is a tuning parameter to denote a maximum value (a maximum probability value) of the ALF in the central lane ($\beta$=1), $n^{o_2}$ denotes a lateral position of a center in the right lane, $g_{o_2}$ is a tuning parameter to denote a maximum value of the ALF in the right lane ($\beta$=2).

$$p_r(z_k | T_{j,k}^{i-}, m) = \exp\left(\frac{(\text{abs}(n_k^{j-}) - n^{tar})^2}{2\sigma_t^2}\right), \quad \text{EQUATION 2}$$
$$\text{if } \text{abs}(n_k^{j-}) - n^{tar} < W_{lane} \cdot 0.5$$

In Equation 2, $\sigma_t^2$ is a tuning parameter to denote a dispersion of the ALF, $n^{tar}$ denotes the lateral position of the center of the target lane, $n_k^{j-}$ denotes a lateral position of a j-th path point in k-th step, and 'if' denotes a condition in which the path point exists in the target lane. In this case, $W_{lane}$ denotes the width of the lane, and 'abs' denotes a function to obtain an absolute value.

$$p_r(z_k | T_{j,k}^{i-}, m) = g_{0\beta}\exp\left(\frac{(\text{abs}(n_k^{j-}) - n^{0_\beta})^2}{2\sigma_{0\beta}^2}\right), \quad \text{EQUATION 3}$$
$$\text{if } W_{lane} \cdot (\beta - 0.5) \leq \text{abs}(n_k^{j-}) - n^{0_\beta} < W_{lane} \cdot (\beta + 0.5)$$

In Equation 3, $n^{0_\beta}$ denotes a lateral position at a center of $\beta$-th lane, 'if' denotes a condition in which the path point exists in the $\beta$-th lane, and the operator '·' denotes multiplication operation.

Figure 5:
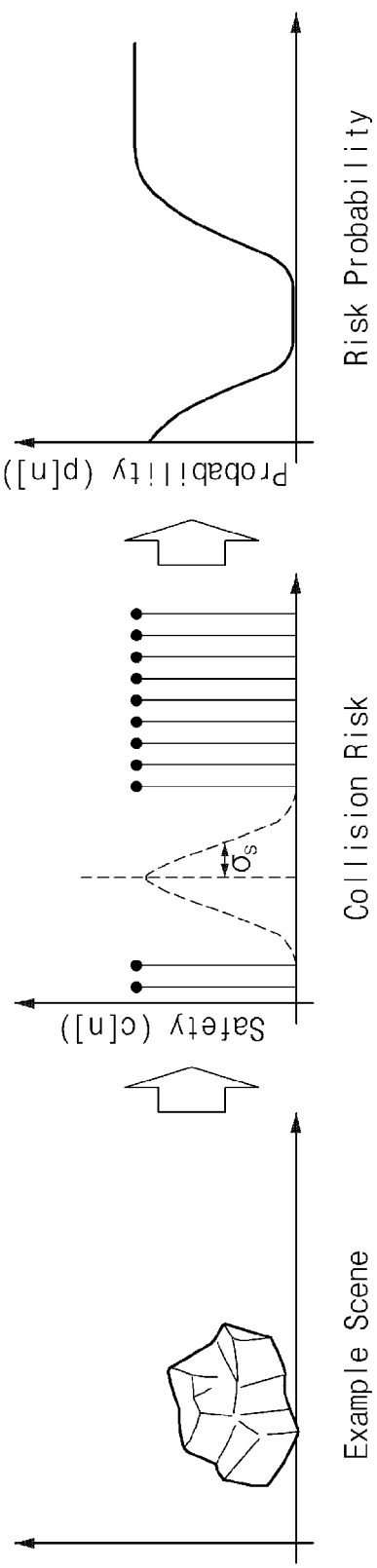
FIG. 5 is a view showing a process of detecting an ALF of a static obstacle by an ALF detector, according to an exemplary embodiment of the present invention.

FIG. 5 shows the process of detecting the ALF of the static obstacle by using the ALF detector 22.

As shown in FIG. 5, a collision risk map is generated based on the recognition information.

Then, the ALF is generated using a Gaussian convolution or a Gaussian blur (Risk Probability). That is, the ALF detector 22 detects the ALF of the static obstacle based on the following Equation 4.

$$G(x, y) = \frac{1}{2\pi\sigma_s^2} e^{-\frac{x^2+y^2}{2\sigma_s^2}} \quad \text{EQUATION 4}$$

In Equation 4, $\sigma_s^2$ corresponds to a dispersion of the sensor indicating uncertainty. In this case, the value increases as the uncertainty increases.

Figure 6:
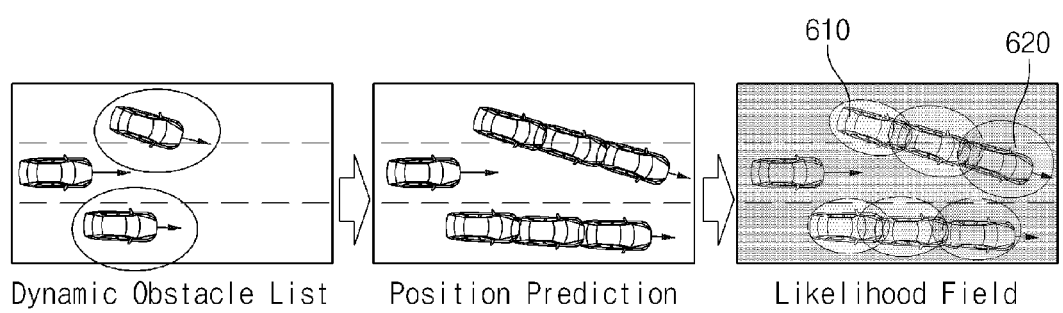
FIG. 6 is a view showing a process of detecting an ALF of a dynamic obstacle by an ALF detector, according to an exemplary embodiment of the present invention.

FIG. 6 shows the process of detecting the ALF of the dynamic obstacle by using the ALF detector 22.

As shown in FIG. 6, a position of the obstacle is predicted (Position Prediction) using a dynamic obstacle list and information of the road shape.

Then, the ALF is generated using the Gaussian convolution or the Gaussian blur (Likelihood Field). That is, the ALF detector 22 detects the ALF of the dynamic obstacle based on the following Equation 5. In this case, an area 610 indicates an area in which a probability of the existence of the dynamic obstacle is relatively high, and an area 620 indicates an area in which a probability of the existence of the dynamic obstacle is relatively low.

$$G(x, y) = \frac{1}{2\pi\sigma_d^2} e^{-\frac{x^2+y^2}{2\sigma_d^2}}, \text{ where } \sigma_d^2 = f(t_{pre}, v_d) \quad \text{EQUATION 5}$$

In Equation 5, $\sigma_d^2$ corresponds to a dispersion of the dynamic obstacle and is represented as a function (f) of time ($t_{pre}$) and speed ($V_d$), which estimate a position of the obstacle. In general, as the time becomes longer and the speed becomes faster, a dispersion value tends to increase.

Meanwhile, an integrated ALF obtained by integrating the ALF of the road, the ALF of the static obstacle, and the ALF of the dynamic obstacle by the ALF detector 22 is as the following Equation 6.

$$p(z_k \mid T_{i,k}^{j-}, m) = \prod_{a=1}^{n} p^a(z_k^a \mid T_{i,k}^{j-}, m) =$$

$$p^r(z_k^a \mid T_{i,k}^{j-}, m) \times p^s(z_k^a \mid T_{i,k}^{j-}, m) \times p^d(z_k^a \mid T_{i,k}^{j-}, m)$$

EQUATION 6

Equation 6 means that "integrated ALF($p(z_k|T_{i,k}^{j-},m)$)= ALF($p^r(z_k^a|T_{i,k}^{j-},m)$) of the road shape×ALF($p^s(z_k^a|T_{i,k}^{j-},m)$) of the static obstacle×ALF($p^d(z_k^a|T_{i,k}^{j-},m)$) of the dynamic obstacle". An additional parameter may be applied to Equation 6 by multiplying the additional parameter by the right-hand side.

Figure 7:
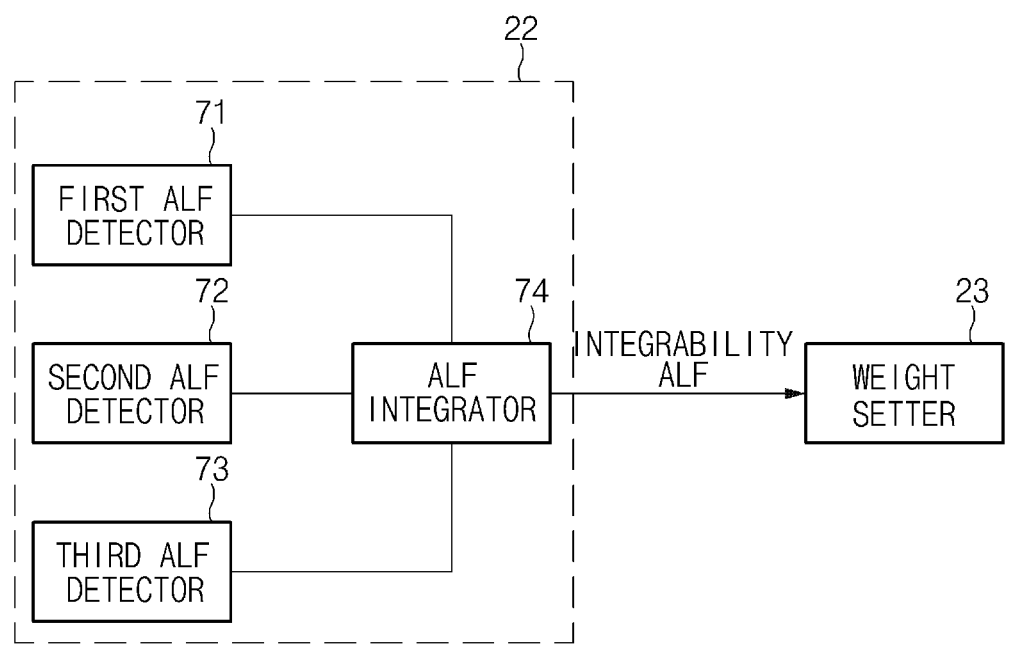
FIG. 7 is a block diagram showing a configuration of an ALF detector, according to an exemplary embodiment of the present invention.

FIG. 7 is a block diagram showing a configuration of the ALF detector 22 according to an exemplary embodiment of the present invention.

Referring to FIG. 7, the ALF detector 22 according to the present invention includes a first ALF detector 71, a second ALF detector 72, a third ALF detector 73, and an ALF integrator 74.

The first ALF detector 71 detects a first ALF based on the road information to allow the vehicle to drive along a center of the lane.

The second ALF detector 72 detects a second ALF based on the static obstacle information to avoid a collision with the static obstacle.

The third ALF detector 73 detects a third ALF based on the dynamic obstacle information to avoid a collision with the dynamic obstacle.

The ALF integrator 74 integrates the first ALF, the second ALF, and the third ALF to generate the integrated ALF.

Figure 8:
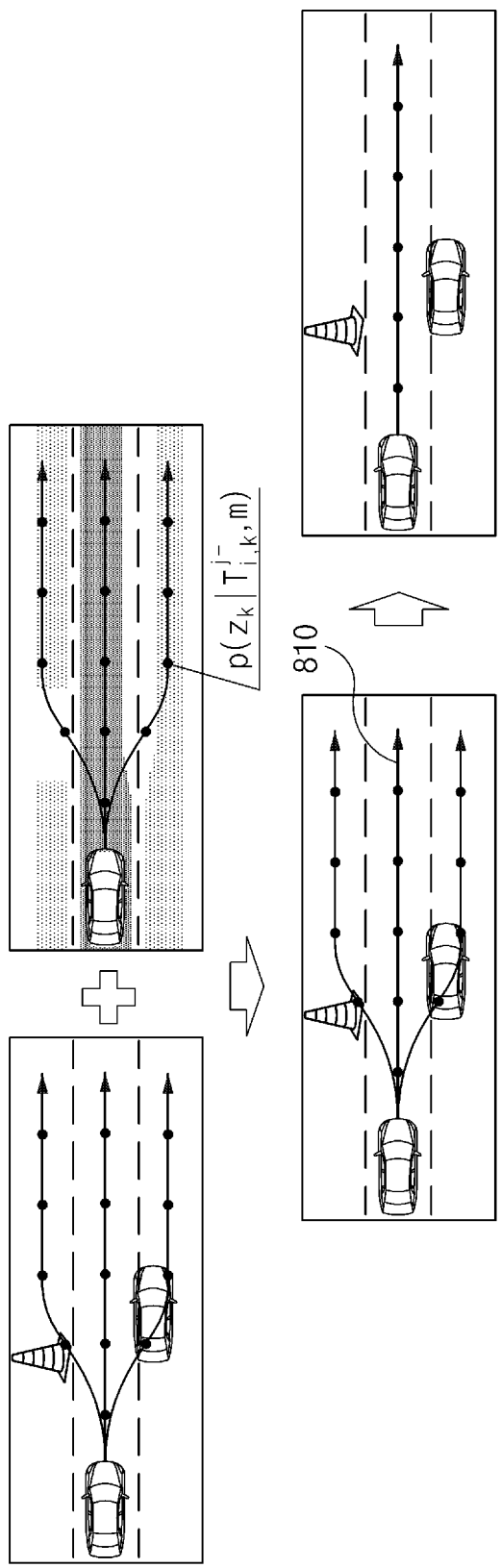
FIG. 8 is a view showing a process of setting a weight by a weight setter, according to an exemplary embodiment of the present invention.

Then, the weight setter 23 applies the ALF detected by the ALF detector 22 to each path generated by the path generator 21 to set the weight with respect to each path as shown in FIG. 8. In this case, the weight setter 23 gives a high weight to a path 81o that has a low probability of collision with the obstacle.

Then, the path determiner 24 determines the final autonomous driving path based on the weight set by the weight setter 23 with respect to each path.

Figure 9:
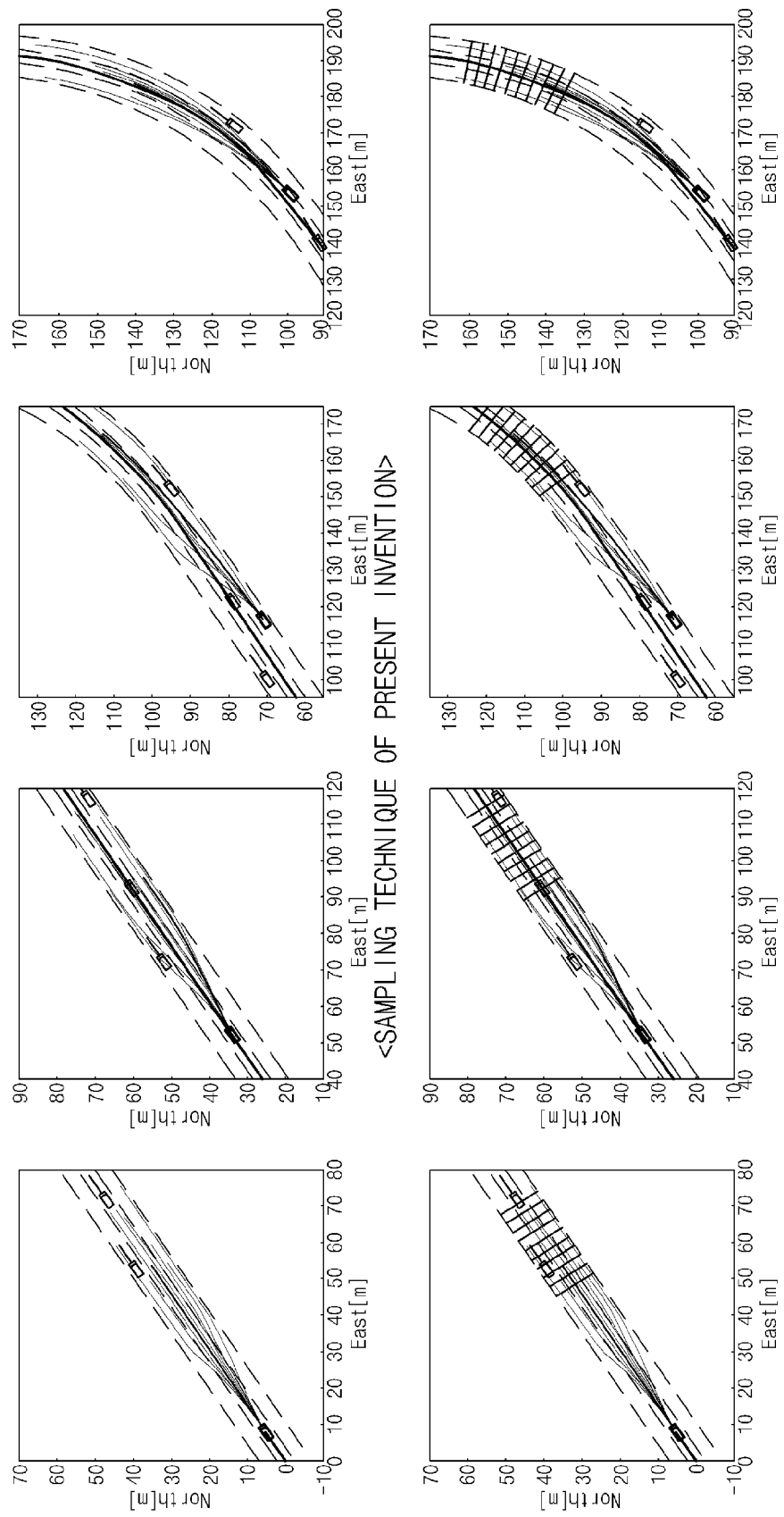
FIG. 9 is a performance analysis diagram of a path determining apparatus for an autonomous driving vehicle, according to an exemplary embodiment of the present invention.

FIG. 9 is a performance analysis diagram of the path determining apparatus for the autonomous driving vehicle according to an exemplary embodiment of the present invention.

As shown in FIG. 9, there is no big difference between the autonomous driving path determined by the embodiment of the present invention and an autonomous driving path determined by a conventional sampling technique. Consequently, since the method of determining the autonomous driving path according to the present invention determines the path using much less samples than that of the conventional sampling technique, a calculation complexity required to determine the autonomous driving path is lowered, and thus a processing time is shortened.

Figure 10:
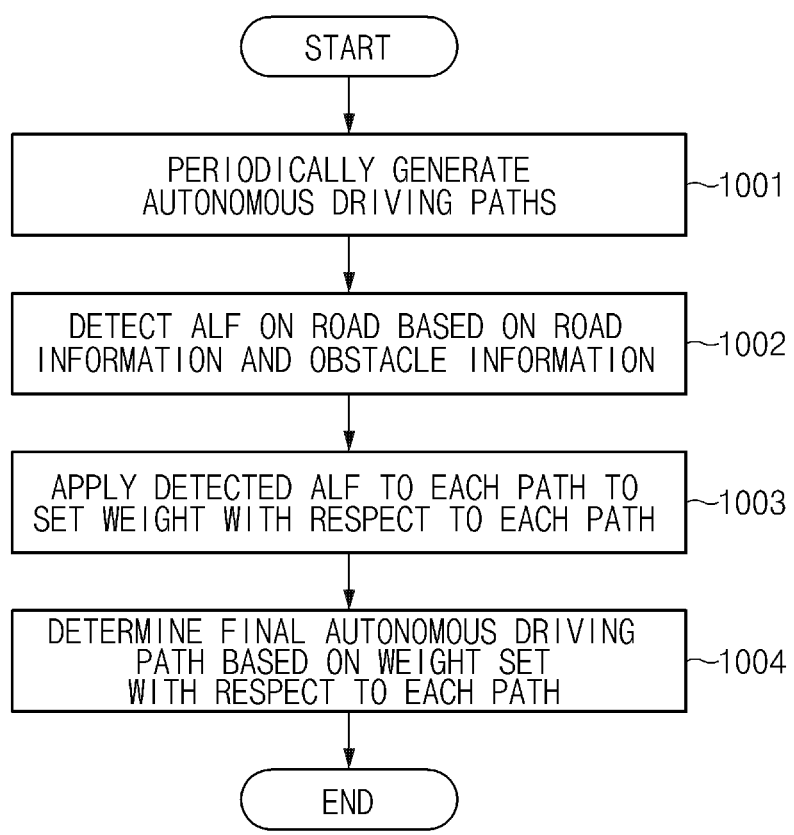
FIG. 10 is a flowchart showing a path determining method of an autonomous driving vehicle, according to an exemplary embodiment of the present invention.

FIG. 10 is a flowchart showing the path determining method of the autonomous driving vehicle according to an exemplary embodiment of the present invention. In the following descriptions, each operation of the path determining method is performed by a corresponding component, but operations may be performed by a controller.

First, the path generator 21 periodically generates the autonomous driving paths (1001).

Then, the ALF detector 22 detects the ALF (Adaptive Likelihood Field) on the road based on the road information and the obstacle information (1002).

The weight setter 23 applies the ALF detected by the ALF detector 22 to each path generated by the path generator 21 to set the weight with respect to each path (1003).

Next, the path determiner 24 determines the final autonomous driving path based on the weight with respect to each path, which is set by the weight setter 23 (1004).

Meanwhile, the above-mentioned method of embodiments of the present invention may be implemented as a computer program. Codes and code segments constituting the computer program may be readily inferred by a computer programmer in the field. In addition, the computer program may be stored in computer-readable recording media (memory) and may be read and executed by a processor in a computer, thereby implementing the method of embodiments of the present invention. In addition, the recording media includes all types of recording media that are computer-readable.

According to embodiments of the present invention, the autonomous driving paths are periodically generated, the ALF on the road is detected based on the road information and the obstacle information, the weight with respect to each of the autonomous driving paths is set by applying the ALF to each of the autonomous driving paths, and the final autonomous driving path is determined based on the set weight. Thus, the optimal autonomous driving path may be determined among the optimized candidate paths.

Hereinabove, although the present invention has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A path determining apparatus for an autonomous driving vehicle, the apparatus comprising:
    a processor; and
    a memory storing a program to be executed in the processor, the program comprising instructions for:
        periodically generating a plurality of autonomous driving paths,
        detecting an adaptive likelihood field (ALF) on a road based on road information and obstacle information, wherein the instructions for detecting the ALF comprise instructions for detecting the ALF based on the road information such that the autonomous driving vehicle drives along a center of a lane,
        applying the detected ALF to each of the autonomous driving paths generated and setting a weight with respect to each of the autonomous driving paths, and
        determining a final autonomous driving path based on the weight set with respect to each of the autonomous driving paths.

2. The path determining apparatus of claim 1, wherein the instructions for periodically generating the plurality of autonomous driving paths comprise instructions for:
    calculating target positions at a current time point based on target positions calculated at a previous time point and present driving information, and
    updating the autonomous driving paths.

3. The path determining apparatus of claim 2, wherein the driving information comprise a speed of the vehicle, an azimuth of the vehicle, and model information of the vehicle.

4. The path determining apparatus of claim 1, wherein the obstacle information comprise static obstacle information and dynamic obstacle information.

5. The path determining apparatus of claim 4, wherein the instructions for detecting the ALF comprise instructions for:
- detecting a first ALF based on the road information such that the vehicle drives along the center of the lane;
- detecting a second ALF based on the static obstacle information such that the vehicle avoids a collision with a static obstacle;
- detecting a third ALF based on the dynamic obstacle information such that the vehicle avoids a collision with a dynamic obstacle; and
- integrating the first ALF, the second ALF, and the third ALF to generate a final ALF.

6. The path determining apparatus of claim 5, wherein the road information comprise at least one of a lane of the road, a width of the road, or a shape of the road.

7. The path determining apparatus of claim 5, wherein the static obstacle information comprise at least one of a position, a size, or a shape of the static obstacle on the road.

8. The path determining apparatus of claim 5, wherein the dynamic obstacle information comprise at least one of a position, a speed, a direction, a size, or a shape of the dynamic obstacle on the road.

9. The path determining apparatus of claim 1, wherein instructions for applying the detected ALF to each of the autonomous driving paths generated and setting a weight with respect to each of the autonomous driving paths comprise instructions for:
- giving a high weight to an autonomous driving path in which the autonomous driving vehicle has a low probability of collision with an obstacle among the autonomous driving paths.

10. The path determining apparatus of claim 9, wherein instructions for determining a final autonomous driving path comprise instructions for:
- determining the autonomous driving path given with the high weight as the final autonomous driving path.

11. An autonomous driving vehicle comprising:
a path determining apparatus comprising a processor and a memory storing a program to be executed in the processor, the program comprising instructions for:
- periodically generating a plurality of autonomous driving paths,
- detecting an adaptive likelihood field (ALF) on a road based on road information and obstacle information, wherein the instructions for detecting the ALF comprise instructions for detecting the ALF based on the road information such that the autonomous driving vehicle drives along a center of a lane,
- applying the detected ALF to each of the autonomous driving paths generated and setting a weight with respect to each of the autonomous driving paths, and
- determining a final autonomous driving path based on the weight set with respect to each of the autonomous driving paths.

12. The autonomous driving vehicle of claim 11, wherein the instructions for periodically generating the plurality of autonomous driving paths comprise instructions for:
- calculating target positions at a current time point based on target positions calculated at a previous time point and present driving information, and
- updating the autonomous driving paths.

13. The autonomous driving vehicle of claim 12, wherein the driving information comprise a speed of the vehicle, an azimuth of the vehicle, and model information of the vehicle.

14. The autonomous driving vehicle of claim 11, wherein instructions for applying the detected ALF to each of the autonomous driving paths generated and setting a weight with respect to each of the autonomous driving paths comprise instructions for:
- giving a high weight to an autonomous driving path in which the autonomous driving vehicle has a low probability of collision with an obstacle among the autonomous driving paths.

15. The autonomous driving vehicle of claim 14, wherein instructions for determining a final autonomous driving path comprise instructions for:
- determining the autonomous driving path given with the high weight as the final autonomous driving path.

16. An autonomous driving vehicle comprising:
a path determining apparatus comprising a processor and a memory storing a program to be executed in the processor, the program comprising instructions for:
- periodically generating a plurality of autonomous driving paths,
- detecting an adaptive likelihood field (ALF) on a road based on road information and obstacle information, wherein the obstacle information comprise static obstacle information and dynamic obstacle information, wherein the instructions for detecting the ALF comprise instructions for detecting the ALF based on the road information such that the autonomous driving vehicle drives along a center of a lane,
- applying the detected ALF to each of the autonomous driving paths generated and setting a weight with respect to each of the autonomous driving paths, and
- determining a final autonomous driving path based on the weight set with respect to each of the autonomous driving paths.

17. The autonomous driving vehicle of claim 16, wherein the instructions for detecting the ALF comprise instructions for:
- detecting a first ALF based on the road information such that the drives along the center of the lane;
- detecting a second ALF based on the static obstacle information such that the vehicle avoids a collision with a static obstacle;
- detecting a third ALF based on the dynamic obstacle information such that the vehicle avoids a collision with a dynamic obstacle; and
- integrating the first ALF, the second ALF, and the third ALF to generate a final ALF.

18. The autonomous driving vehicle of claim 17, wherein the road information comprise at least one of a lane of the road, a width of the road, or a shape of the road.

19. The autonomous driving vehicle of claim 17, wherein the static obstacle information comprise at least one of a position, a size, or a shape of the static obstacle on the road.

20. The autonomous driving vehicle of claim 17, wherein the dynamic obstacle information comprise at least one of a position, a speed, a direction, a size, or a shape of the dynamic obstacle on the road.

* * * * *